(12) United States Patent
Hachmann (10) Patent No.: US 6,571,320 B1
(45) Date of Patent: May 27, 2003

(54) CACHE MEMORY FOR TWO-DIMENSIONAL DATA FIELDS

(75) Inventor: Ulrich Hachmann, München (DE)

(73) Assignee: Infineon Technologies AG, München (DE)

( * ) Notice: Subject to any disclaimer, the term of this patent is extended or adjusted under 35 U.S.C. 154(b) by 214 days.

(21) Appl. No.: 09/707,558

(22) Filed: Nov. 7, 2000

Related U.S. Application Data

(63) Continuation of application No. PCT/DE99/01190, filed on Apr. 20, 1999.

(30) Foreign Application Priority Data

May 7, 1998 (DE) .......................................... 198 20 457

(51) Int. Cl.[7] .............................................. G06F 12/08
(52) U.S. Cl. ...................... 711/141; 711/113; 711/118; 711/149; 711/150; 711/154; 711/167; 711/168; 711/169; 345/547; 345/552; 345/557; 345/558; 345/665
(58) Field of Search ................................ 711/113, 118, 711/131, 141, 149, 150, 151, 167, 168, 169; 345/196, 547, 552, 557, 558, 665

(56) References Cited

U.S. PATENT DOCUMENTS

| 5,379,379 A | * | 1/1995 | Becker et al. ............... 711/158 |
| 5,780,828 A | * | 7/1998 | Mos et al. .................. 235/449 |
| 5,829,026 A | * | 10/1998 | Leung et al. ............... 711/105 |

* cited by examiner

*Primary Examiner*—Do Hyun Yoo
*Assistant Examiner*—Jasmine Song
(74) *Attorney, Agent, or Firm*—Laurence A. Greenberg; Werner H. Stemer; Ralph E. Locher (57) ABSTRACT

The cache memory is particularly suitable for processing images. The special configuration of a memory field, an allocation unit, a write queue, and a data conflict recognition unit enable a number of data items to be read out from the memory field simultaneously per cycle, in the form of line or column segments. The format of the screen windows that are read out can change from one cycle to another. With sufficient data locality, time-consuming reloading operations do not damage the data throughput since the access requests are pipelined.

3 Claims, 7 Drawing Sheets

FIG 7

CACHE MEMORY FOR TWO-DIMENSIONAL DATA FIELDS

CROSS-REFERENCE TO RELATED APPLICATION

This is a continuation of copending international application PCT/DE99/01190, having an international filing date of Apr. 20, 1999, and which designated the United States.

BACKGROUND OF THE INVENTION

Field of the Invention

The invention relates to a cache memory which permits a higher clock frequency in a processing unit than the maximum permissible clock frequency on the basis of the properties of external memory modules and of the printed circuit board. Cache memories in conventional processor structures, such as in the Motorola MO68040, generally permit only one individual data word to be accessed per clock cycle. In the case of two-dimensional data fields, such as images, this means that a plurality of clock cycles are required to read an image section out of the cache memory if the required pixels do not happen to be situated next to one another in a data word, specifically even when all the data is already present in the cache. IEEE Journal of Solid State Circuit, Vol. 25, No. 3, June 1990 discloses on-chip memories having a plurality of row buffers storing full image rows, pixels situated above one another being read out of row buffers arranged above one another, and pixels which have been read out being transferred to the next row buffer so that they are located at the correct position during the next access operation, which is then carried out shifted by one row. However, this has the disadvantages that the image width is limited by the buffer size, the type of reading is stipulated and column-oriented processing of the image data is not possible without reloading.

SUMMARY OF THE INVENTION

It is accordingly an object of the invention to provide a cache memory for two-dimensional data fields which overcomes the above-mentioned disadvantages of the heretofore-known devices and methods of this general type.

With the foregoing and other objects in view there is provided, in accordance with the invention, a cache memory, comprising:

a memory array having data blocks and receiving relatively slow input data and outputting relatively fast output data;

a mapper for flexibly allocating sections within a two-dimensional data field to the data blocks in the memory array, the mapper having an input receiving a request signal and forming from the request signal a write command for a write queue and a read command for a read queue;

a hazard detection unit connected to the mapper for preventing a write control signal from starting a write operation before all read commands in the read queue have been processed whose associated data have already been loaded in the memory array but must not be overwritten yet because the data have not been read from the memory array yet, whereby the hazard detection unit forms a hazard signal from the write commands delayed by the write queue and from addresses from the read queue;

a write controller connected to the hazard detection unit for forming a write control signal for the memory array from the delayed write command and the hazard signal and a synchronization signal; and a read controller connected to the memory array for forming a read control signal for the memory array from the read signal delayed by the read queue and the synchronization signal, the synchronization signal ensuring that the read control signal is not generated until the required data are present in the memory array.

In accordance with an added feature of the invention, the cache memory has the following further features:

the memory array has memory cells with a first read port, a second read port, and a write port;

the first read port is connected to one of a plurality of vertical read lines and the second read port is connected to one of a plurality of horizontal read lines;

the memory array is split into two separate blocks, with the horizontal read lines in the two blocks being isolated from one another;

the vertical read lines are freely allocatable to the outputs for the output data via a crossbar switch; and each of the blocks contains diagonally distributed switches between the vertical read lines and the horizontal read lines such that the horizontal read lines can be connected to the crossbar switch via the vertical read lines such that arbitrarily shiftable data field portions are readable with a single access operation.

In accordance with a concomitant feature of the invention, the cache-memory is further characterized by the following advantageous features:

the mapper is configured to form from a request signal write commands and read commands for controlling a given memory array, whereby a request contains a position, a format, and a number for a requested section of a two-dimensional data field, and in which the mapper is configured to check whether all the data in the requested section are already stored in the memory array;

the mapper has mutually isolated data sections which have a portion description with a description of the two-dimensional data field and which can be initialized by means of the request;

the isolated data sections each have two block entries for at least two cache memory blocks in the memory array; and a respective block entry contains a beginning column and a beginning row in a respective section in the two-dimensional data field, a beginning row in the cache memory block, and a number of rows in the respective cache memory block, and also a resident flag indicating whether the cache memory block actually contains valid rows.

Other features which are considered as characteristic for the invention are set forth in the appended claims.

Although the invention is illustrated and described herein as embodied in a cache memory for two-dimensional data fields, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

The special design of the memory array and of the mapper permits, by way of example, a plurality of pixels to be simultaneously read out of the memory array per clock cycle and processed in parallel in a processor array. In this context, the format of the image windows which are read out can change from clock cycle to clock cycle and, by way of example, may have image sections comprising two row segments with 8 pixels up to image sections comprising two column elements with 8 pixels. No buffers are therefore necessary to hold one or more whole image rows. A write queue, a read queue and a hazard detection unit prevent hazards when reading from and writing to the memory array. The time-consuming reloading operations do not impair the data throughput in this case, because, although the pipeline processing of the access requests does not, reduce the latency time for the individual access operations, the throughput requires only a few access operations per image section if there is sufficient locality of the data, that is to say of one of the aforementioned image sections in this case, for example, and so the data transfer throughput to the external memory is reduced.

Figure 1:
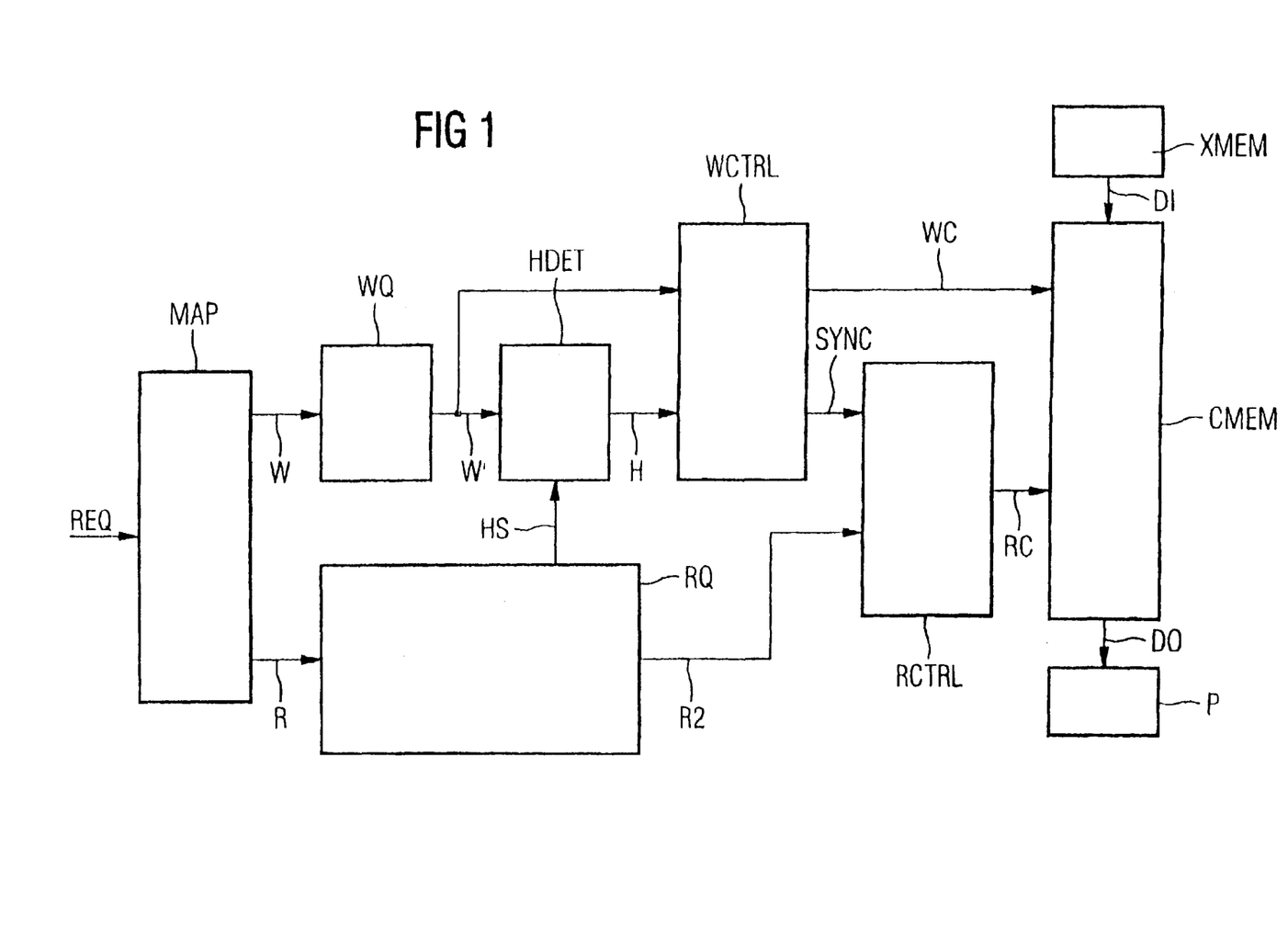
FIG. 1 shows a block diagram of an exemplary embodiment of the entire cache memory according to the invention.

Referring now to the figures of the drawing in detail and first, particularly, to FIG. 1 thereof, there is seen a simplified illustration of a cache memory between an external memory XMEM and a processing unit P, the processing unit generally comprising a processor array. The cache memory essentially has a memory array CMEM and a cache controller which uses a request signal REQ to form write control signals WC and read control signals RC for the memory array CMEM and, correspondingly, also for the external memory and the processing unit P, input data DI being read from the external memory XMEM into the memory array and output data DO being read from the memory array into the processing unit. The cache controller essentially has a mapper MAP, a write queue WQ, a read queue RQ, a hazard detection unit HDET, a write controller WCTRL and a read controller RCTRL. The mapper MAP uses description data records PortionEntry to map sections within a two-dimensional data field, e.g. within an image, onto data blocks in the cache memory flexibly and thus produces from the request signal REQ write commands W, which are supplied to the write queue WQ, and read commands R, which are supplied to the read queue RQ. Waiting at the output of the write queue WQ are delayed write commands W' which are supplied both to the write controller WCTRL and to the hazard detection unit HDET. In this context, on the basis of the delayed write commands W' and on the basis of addresses HS for all the cache memory cells which are still to be read and were requested before a cache miss, that is to say a read inquiry whose associated data has not yet actually been loaded in the memory array CMEM, the hazard detection unit HDET forms a hazard report signal H which prevents the write controller WCTRL from outputting write control signals WC in a hazard situation. The hazard detection unit HDET prevents write requests from being started before all the hits, that is to say the inquiries whose associated data has already been loaded in the memory CMEM, in the read queue RQ have been processed. The read controller RCTRL receives a synchronization signal SYNC from the write controller WCTRL and write commands R2 delayed by the read queue RQ and forms the read signal RC at the output. The synchronization signal SYNC ensures that, upon an inquiry, an associated read control signal RC is not generated until the required data has already been transferred to the cache memory CMEM from the external memory XMEM.

Figure 2:
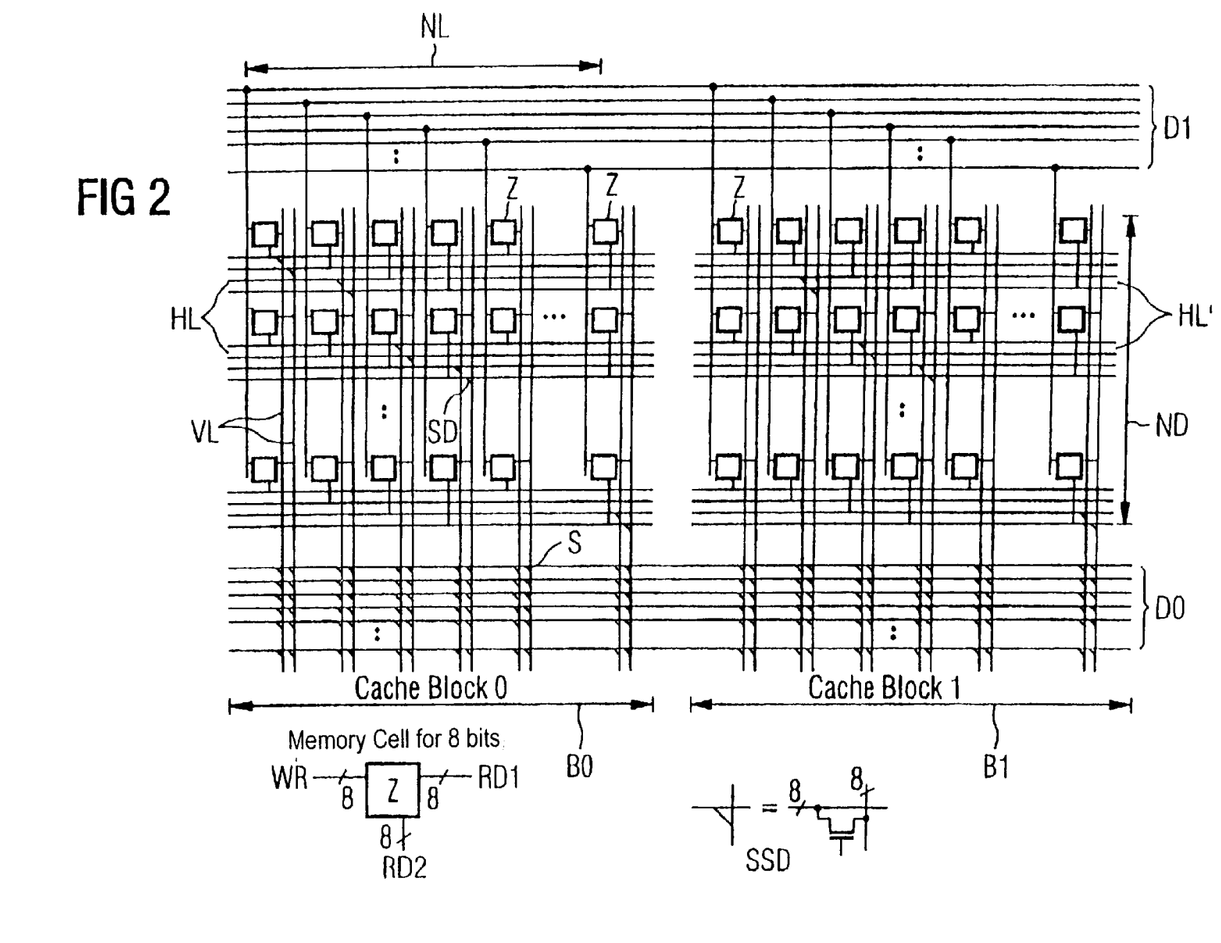
FIG. 2 is a detailed circuit diagram of the memory array shown in FIG. 1.

Referring now to FIG. 2, there is shown, by way of example, a memory array CMEM having the associated data paths. The memory array CMEM contains memory cells Z which each have 8 bits and have two separate read ports RD1 and RD2 for reading out from and a write port WR for writing to the cell Z. One read port supplies vertical read lines VL and the other read port supplies horizontal read lines HL, and HL'. The vertical read lines can be freely allocated to the outputs for the output data DO by means of a crossbar switch. The memory array is split into two separate blocks B0 and B1, the horizontal read lines HL in the block B0 being isolated from the horizontal read lines HL' in the block B1. Each block contains diagonally distributed switches between the vertical read lines VL and the horizontal read lines HL and HL' such that the horizontal read lines can be connected to the crossbar switch, which has a multiplicity of switches S, via the vertical read lines. This allows a plurality of pixels in an image row or in a two-row matrix to be read out in parallel via the vertical read lines in this case, or else allows column segments or matrices having two columns to be read out via the horizontal and vertical read lines.

Figure 3:
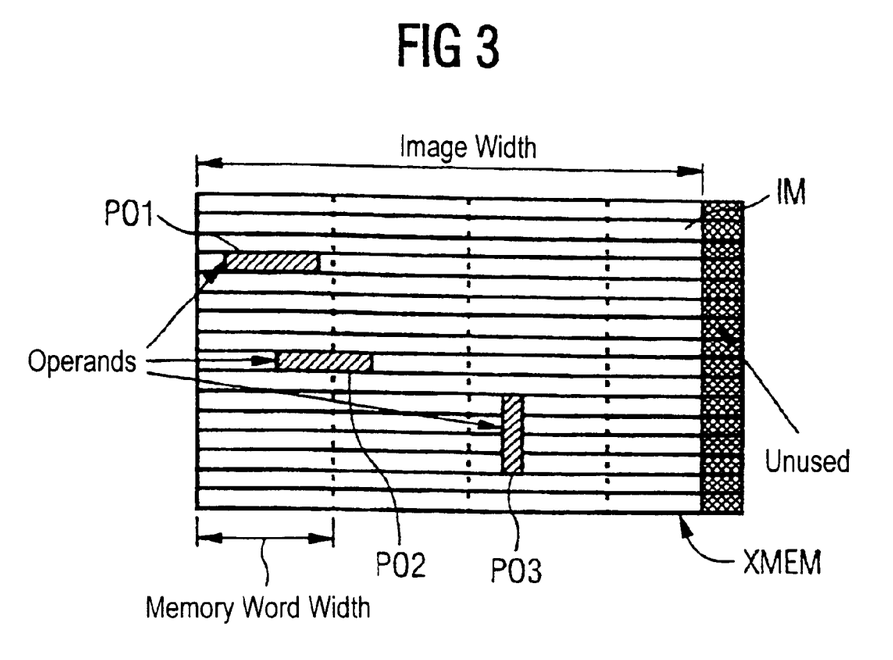
FIG. 3 is a schematic illustration explaining the image storage format in the external image memory.

FIG. 3 explains how an image, for example, is stored in the external memory XMEM. The first 32 bytes of the first row of an image are situated in the first data word, for example, which is addressed by an image base address. A data word which is determined by the next highest address receives the 32 bytes which are adjacent on the right in the image row, etc . . . At the end of the row, a jump is made to the start of the next row. If the row length is not equal to a multiple of 32 bytes, the row is filled with unused bytes up to a multiple of 32 bytes, so that each image row in the external memory starts at a 32-byte word boundary. Hence, the image is subdivided into vertical strips with a width of 32 bytes. FIG. 3 shows a few possible processing operands PO1 . . . PO3, the processing operand PO1 being contained entirely in one memory word, the processing operand PO2 being distributed between two memory words, or else, in the case of a column-like arrangement, the processing operand PO3 being contained in a plurality of memory words. The afore-mentioned memory array having two isolated blocks B0 and B1 is of particular advantage especially for the processing operand PO2. For the processing operand PO3, without the cache memory, the number of access operations would be the same as the number of pixels required, and the memory bus width would be used only minimally.

The request REQ contains a position (for example the x, y coordinates), a format (for example row, column or matrix), and an image number for a requested image section. The mapper MAP checks whether all the requested pixels are already stored in the cache memory array and calculates the physical addresses for the external memory XMEM and the cache memory array CMEM. In this case, image rows and cache rows are allocated on a single-associative or direct-mapped basis for example, that is to say that the least significant bits of the image row number are identical to the address of the associated cache row.

Figure 4:
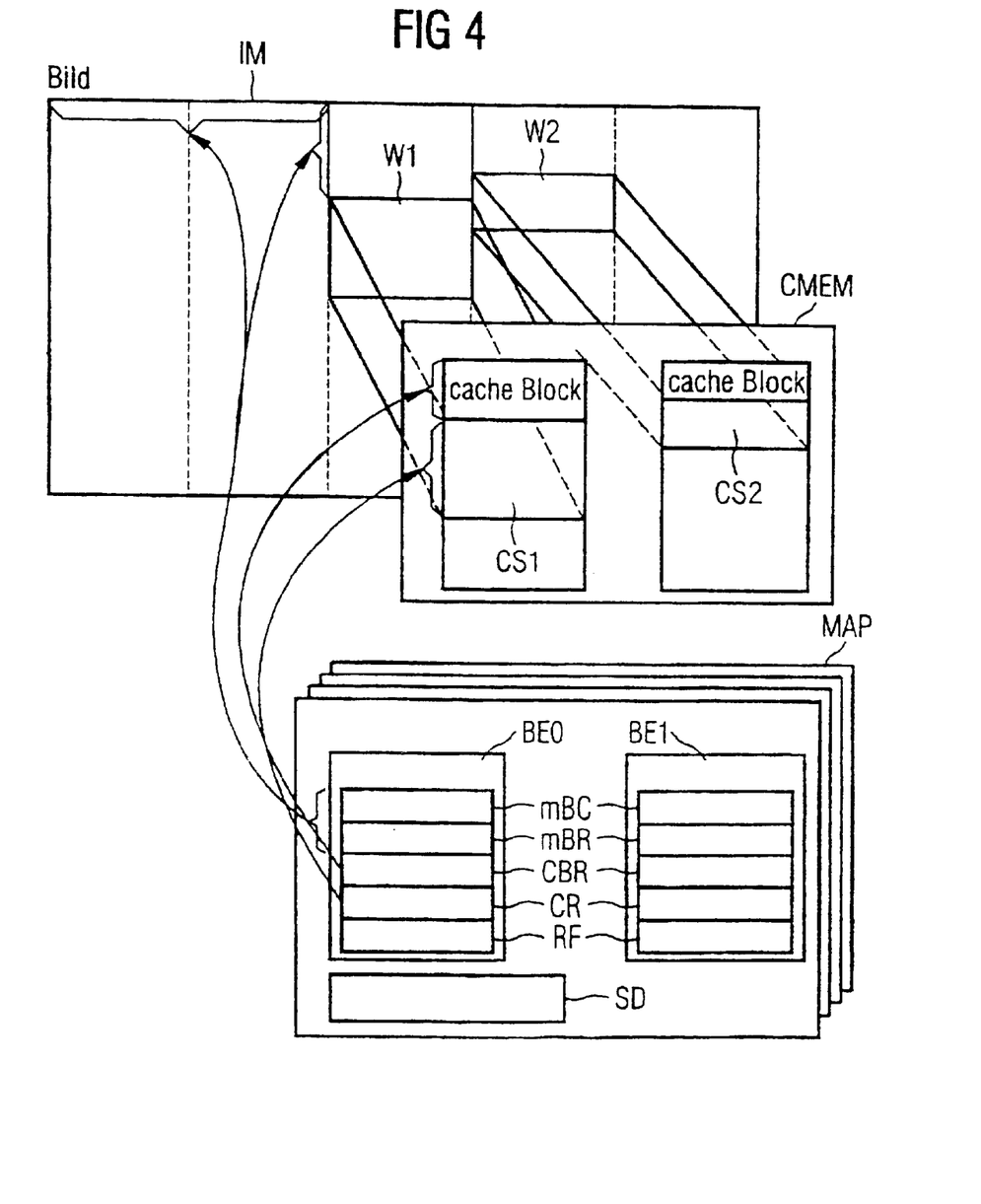
FIG. 4 is a diagrammatic illustration explaining the operation of the mapper shown in FIG. 1.

The mapper MAP indicated by way of example in FIG. 4 has mutually isolated data sections, so-called portion entries, which have a portion description SD which contains the features of the image and can be initialized by means of the request REQ. in addition, a respective portion entry contains two block entries BE0 and BE1 for two cache memory blocks GS1 and CS2 in the cache memory array CMEM. Such a block entry contains a beginning column mBC and a beginning row mBR in an image window W1 in the whole image IM, a beginning row CBR in the cache block and the number CR of rows in the respective cache section and also a resident flag RF, which indicates whether the cache block actually contains valid rows. So that more than one processor in the processing unit P can use the cache memory at the same time, a plurality of such portion entries may be provided. This makes it possible to manage a plurality of image objects in the cache memory at the same time.

If external memory modules are used which can be read out efficiently only using two-word bursts, or in applications for which a large window width is useful, a plurality of cache block sections may also be allocated to a plurality-of image strips in one cache block, with, by way of example, all the odd-numbered image strips being allocated to a cache block section CS1 and all the even-numbered image strips being allocated to a cache block section CS2.

For the situation in which a requested and stored section has no overlap, a write command for the full requested section is transferred into the write queue WQ and a read command is transferred to the read queue RQ. Data which had been stored previously in the cache block concerned is invalid for the subsequent requests. In this case, no wait state is produced in the mapper.

If there is an overlap between the requested section and the stored section, one or two write commands are transferred with the as yet unstored image section to the write queue WQ and a read command is transferred to the read queue RQ. Insofar as no previously valid rows are overwritten during reloading, the data contained in the cache block concerned remains valid and is used for the request. Two write commands are necessary if image rows are missing from the top and bottom of the requested image section. In this case, the mapper generates a wait state, otherwise it does not.

For the latter case, where the requested section is contained entirely in the stored section, no write command is necessary. The read command is transferred to the read queue RQ. The data in the cache block concerned remains valid and is used.

A write command, having passed through the write queue WQ, starts reloading an image section from the external memory into the cache memory array CMEM. The image section requested using a command comprises a portion having one or two image columns and one or more rows.

The effect of a read command, once required data have been reloaded into the cache and the processing unit P connected downstream has carried out an enable action, is to output the requested data DO in the appropriate format.

Figure 5:
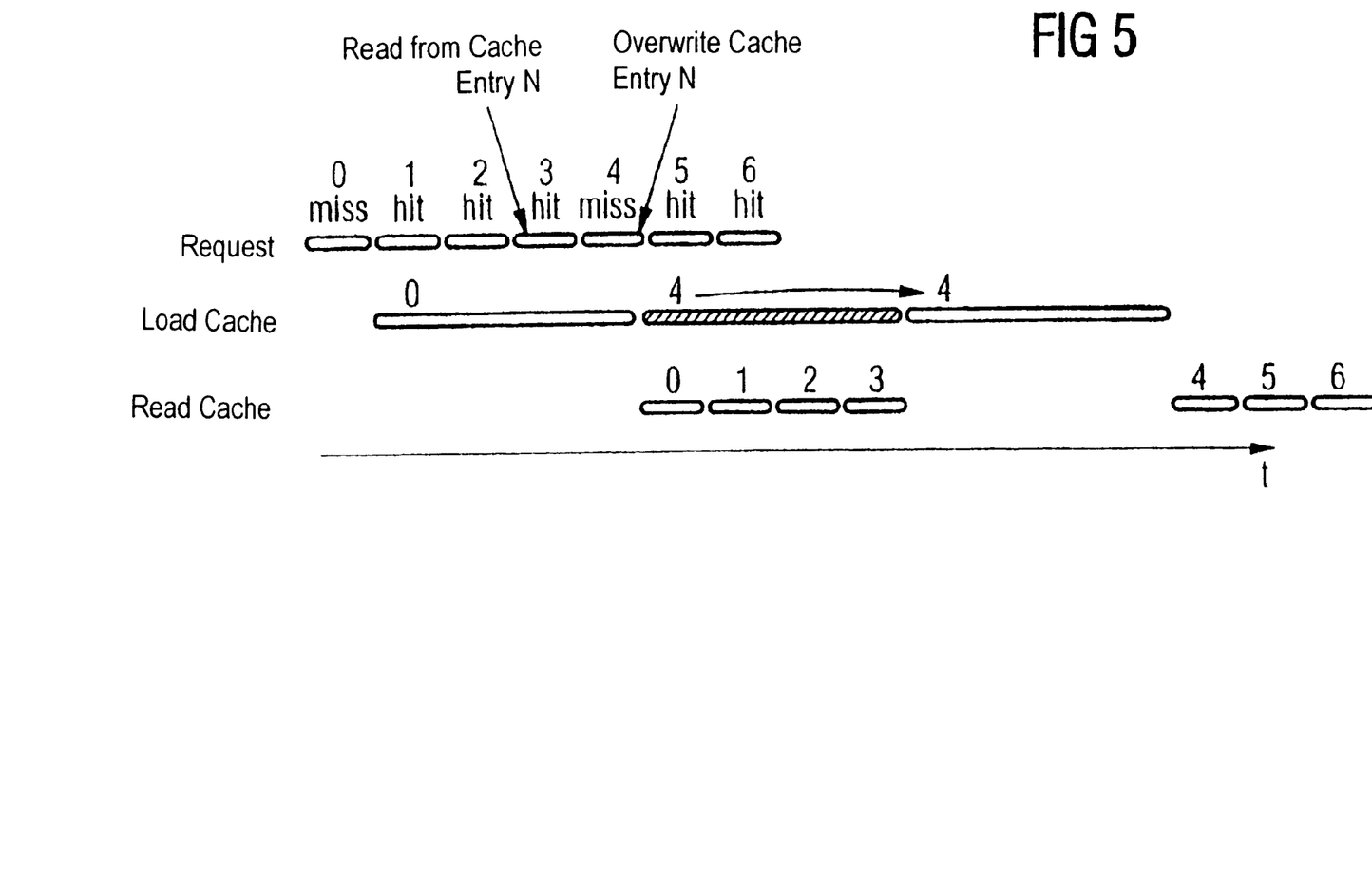
FIG. 5 is a schematic illustration explaining the pipeline processing of the cache access operations.

One difficulty arises when the cache memory is reloaded by means of a pipelining operation or by means of the queues WQ and RQ. When a plurality of access operations have been executed, it is inevitable that all the cache entries have had data written to them and old data needs to be overwritten for new access operations. In this case, it is necessary to ensure that no data is overwritten which is needed to perform actions which are still in the pipeline. FIG. 5 explains that this could result in a loss of data if there is no suitable control if, by way of example, the request 3 is detected as a hit by the cache controller and is placed into a queue, because the required data is present in the cache entry N. The next access operation 4 requires reloading of data which—for example as a result of the read address— unfavorably overwrites the data in entry N. Since, after the access operation 4 is requested, the loading port would be free, it would immediately be possible to start the reloading operation 4'. The data in the entry N are still needed to perform access operation 3, however. The reloading operation for access operation 4 has to be shifted to a later instant 4", because the commands 0 . . . 3 still need to be read out of the queue beforehand. After the latency time of the queue, the command 4 can also be read out of the queue at the instant 4'".

Figure 6:
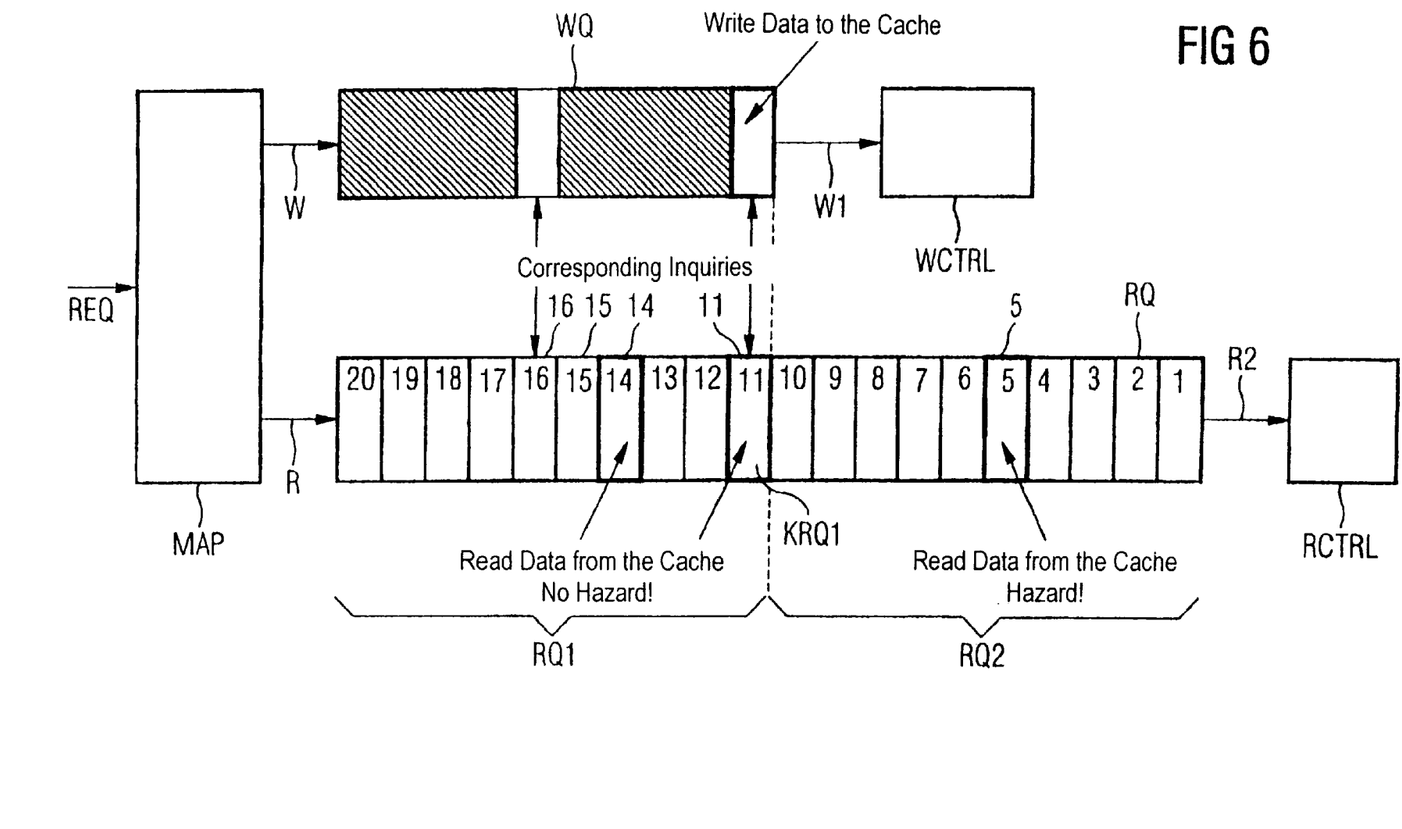
FIG. 6 is a schematic illustration explaining the hazard detection unit.

To explain the way in which the hazard detection unit HDET works, FIG. 6 shows a block diagram containing the mapper MAP, the write queue WQ, the read queue RQ having a first part RQ1 and a second part RQ2, the write controller WC and the read controller RC. The mapper MAP determines the write and read actions which need to take place following request REQ. The reloading operation from the external memory XMEM to the memory array CMEM takes much longer than the output, since a plurality of slow memory clock cycles are required for storage and only one fast processing clock cycle is required for processing, and also the reloading operation from the external memory has a long latency time of, for example, 10 memory clock cycles. Since a large number of read requests are intended to fare without reloading, it is advantageous to process a plurality of requests in a pipeline. The mapper MAP outputs write commands W and read commands R at the same time if a reloading operation is required for a request REQ. Hence, before the read command R for which data is to be reloaded is processed to produce an output cycle, it needs to be delayed until the data is available in the cache memory array CMEM. Since the output should advantageously be effected in the same order as it is requested, the data need to pass through a read queue RQ.

The write commands W are also advantageously temporarily stored in the write queue WQ, even if a reloading operation is processed, since otherwise two successive requests requiring a reloading operation would inevitably bring the pipeline to a standstill. Just a few memory locations in the write queue permit much better utilization of the reloading bandwidth.

As FIG. 5 shows, hazards (data conflicts) can arise when data are reloaded into the cache memory array CMEM. These arise when a reloading operation is to be started which would overwrite valid data in the cache memory array which is still needed for read commands which have already been produced beforehand in the mapper but have not yet been output. At this instant, the read commands are stored in the first read queue RQ. In order to detect a hazard in this way, only the content of the first part RQ1 of the read queue RQ needs to be sought during a reloading operation. At the head K of the write queue WQ there is a reload command which is intended to transfer a data item to—the cache address A. In this case, the cell 11 of the first part RQ1 of the read queue RQ contains, by way of example, the read command corresponding to this, that is to say the two entries originate from the same request and have been simultaneously entered by the mapper MAP in the write queue WQ and in the first part RQ1 of the read queue. Consequently, the cell 11 of the read queue contains a command which reads from the cache address A. The cell 5 of the second part RQ2 of the read queue likewise contains a read access operation to address A and is in conflict with the waiting reloading operation, because the associated request has been started before the request which initiated the command in the cell 11, and hence expects an older data item in the cache address A. To prevent an incorrect response, the second part RQ2 of the read queue RQ thus needs to be executed up to the cell 5 before the reloading operation can be started. Read commands in locations having numbers of greater than or equal to 11, which are read from cache address A, cannot be taken into account in the search because these operations are already expecting the data item which is to be reloaded. Hence, for the search function preventing premature reloading, the read queue RQ needs to be divided into two parts RQ1, and RQ2. The mapper first transfers the commands to the first part RQ1, through which they pass until the corresponding write commands are transferred to the write controller WCTRL as an instruction. At the start of the reloading operation, the read commands are transferred to the second part RQ2 of the read queue. The hazard search is restricted to the second part RQ2 of the read queue.

It will be understood that when a reloading operation is started and the corresponding read command changes over to the second part RQ2, the next reloading operation cannot be started until the read command corresponding to this is at the head KRQ1 of the first part RQ1 of the read queue, because all the preceding commands not connected to a reloading operation need to be in the second part RQ2 of the read queue for the hazard search. In the case of FIG. 6, this means that after the reloading operation for cell 11 is started, the hazard search for the reloading operation for cell 16 may be carried out no earlier than when all the read commands for numbers 15 and below are in the second part RQ2. This can mean a few additional wait cycles, and hence a loss in performance, if the reloading operation for command 11 is over very quickly and the read controller RCTRL were already ready for a command in cell 16, while the first part of the read queue still contains commands having call numbers less than or equal to 15. This happens, for example, when the two parts RQ1 and RQ2 are produced in two separate memories and on13, one command per clock cycle can change from the first part to the second part.

This disadvantage can be overcome, for example, by virtue of the two parts RQ1 and RQ2 being situated in one memory, and the commands being advanced within the queue RQ1 by incrementing write and read pointers, instead of by data transport. This permits the logical transfer of an entire get of commands in one clock cycle. In this type of embodiment, it is advantageous to provide, in addition to a headpointer, and a tail-pointer, also a midpointer, which marks the division between the first part RQ1 and the second part RQ2.

Figure 7:
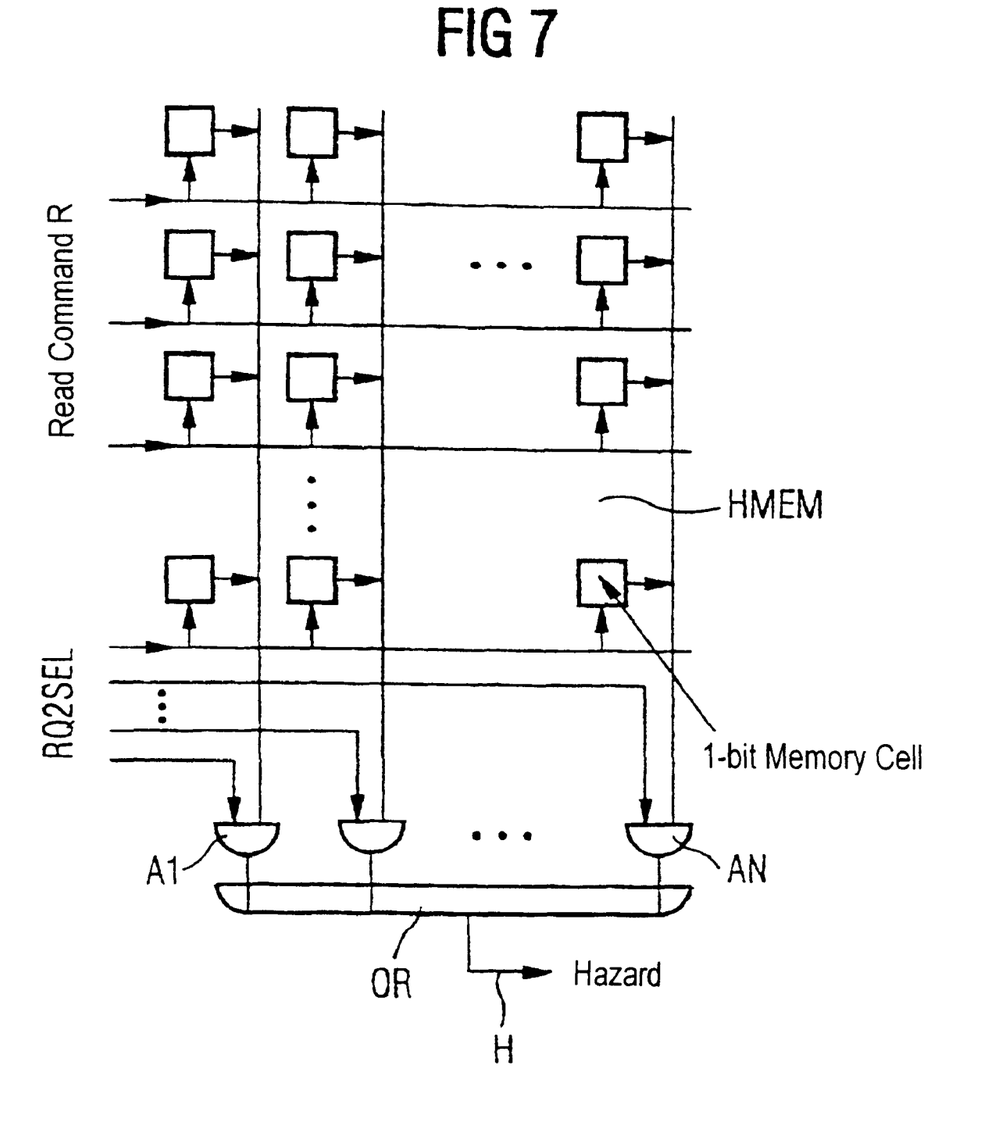
FIG. 7 is a circuit diagram of an advantageous data detection unit.

Whenever a cache row is loaded, it is necessary to check whether this queue section contains a command which reads from the same row. This check can be implemented particularly simply using an arrangement as shown in FIG. 7. In this case, RQ1 and RQ2 are implemented by a memory array HMEM whose column number is equivalent to the number of entries in RQ1 and RQ2 and whose row number is equivalent to the number of cache rows. When a read command is entered in RQ1, a data word is written to the column determined by the;write pointer. Each bit of this word reflects the read status of the Corresponding cache row, with a 1 signifying reading and a 0 signifying non-reading in this case, for example. Since one command can read a plurality of cache rows, a plurality of bits in a column can be set in this case. Thus, a row in the memory array HMEM represents the status of a cache row for the entire read queue RQ1 and RQ2.

Before a cache row is overwritten, a row is read out of the memory array HMEM. Each bit read out is respectively logically combined with a selection bit comprising a selection signal RQ2SEL in a respective AND gate A1 . . . An and is combined via an OR gate OR to form the hazard signal H. The selection bits use 1 levels at the appropriate positions to mark the columns which belong to the read queue section RQ2.

The write controller WCTRL converts the write commands WC into appropriate actuation cycles for the cache memory array and the external memory. The write command WC can reload a plurality of cache rows. The reloading of each cache row requires close cooperation with the hazard detection unit HDET. The conversion of a command generally lasts a plurality of clock cycles.

The read controller RCTRL converts the read commands from the read queue RQ into control signals for the cache memory array. In this case, the throughput is generally one command and one output per clock cycle. If a read command is connected to a reloading operation, wait cycles are introduced if appropriate until the reloading operation is complete. Since a plurality of pixels are read out with each output, there are a multiplicity of formats for the representation of the pixels at the cache output DO. Apart from the activation of the appropriate cache rows, the read controller thus has the task of actuating the appropriate switching points S of the crossbar switch.

What is claimed is:

1. A cache memory, comprising:

a memory array having data blocks and receiving relatively slow input data and outputting relatively fast output data;

a mapper for flexibly allocating sections within a two-dimensional data field to said data blocks in said memory array, said mapper having an input receiving a request signal and forming from the request signal a write command for a write queue and a read command for a read queue;

a hazard detection unit connected to said mapper for preventing a write control signal from starting a write operation before all read commands in the read queue have been processed whose associated data have already been loaded in said memory array but must not be overwritten yet because the data have not been read from the memory array yet, whereby said hazard detection unit forms a hazard signal from the write command delayed by the write queue and from addresses from the read queue;

a write controller connected to said hazard detection unit for forming a write control signal for said memory array from the delayed write command and the hazard signal and a synchronization signal; and a read controller connected to said memory array for forming a read control signal for said memory array from a read signal delayed by the read queue and the synchronization signal, the synchronization signal ensuring that the read control signal is not generated until the required data are present in the memory array.

2. The cache memory according to claim 1, wherein said memory array has memory cells with a first read port, a second read port, and a write port;

said first read port is connected to one of a plurality of vertical read lines and said second read port is connected to one of a plurality of horizontal read lines;

said memory array is split into two separate blocks, with the horizontal read lines in the two blocks being isolated from one another;

the vertical read lines are freely allocatable to the outputs for the output data via a crossbar switch; and each of said blocks contains diagonally distributed switches between the vertical read lines and the horizontal read lines such that the horizontal read lines can be connected to said crossbar switch via the vertical read lines such that arbitrarily shiftable data field portions are readable with a single access operation.

3. The cache-memory according to claim 1, wherein said mapper is configured to form from a request signal write commands and read commands for controlling a given memory array, whereby a request contains a position, a format, and a number for a requested section of a two-dimensional data field, and in which said mapper is configured to check whether all the data in the requested section are already stored in said memory array;

said mapper has mutually isolated data sections which have a portion description with a description of the two-dimensional data field and which can be initialized by means of the request;

said isolated data sections each have two block entries for at least two cache memory blocks in said memory array; and a respective block entry contains a beginning column and a beginning row in a respective section in said two-dimensional data field, a beginning row in said cache memory block, and a number of rows in the respective cache memory block, and also a resident flag indicating whether the cache memory block actually contains valid rows.

* * * * *